L. A. BUCHTEL.
CUTTER FOR MEAT, VEGETABLES, AND PASTRY.
APPLICATION FILED JULY 22, 1920.
1,364,863.
Patented Jan. 11, 1921.
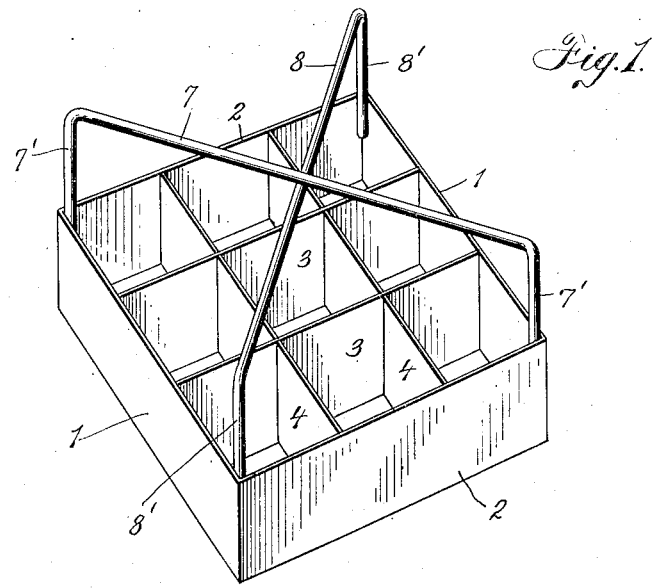
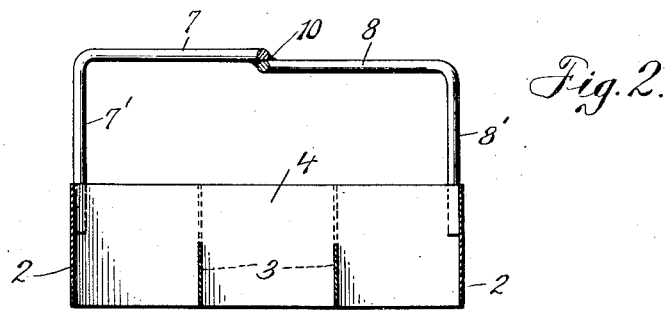
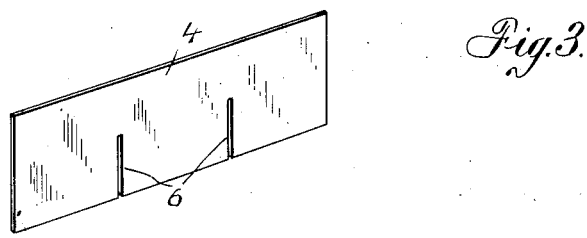

UNITED STATES PATENT OFFICE.

LUISE A. BUCHTEL, OF NEW YORK, N. Y., ASSIGNOR TO GUSTAV WAGENER, OF NEW YORK, N. Y.

CUTTER FOR MEAT, VEGETABLES, AND PASTRY.

1,364,863.　　　　Specification of Letters Patent.　　Patented Jan. 11, 1921.

Application filed July 22, 1920. Serial No. 398,174.

*To all whom it may concern:*

Be it known that I, LUISE A. BUCHTEL, a citizen of the United States, residing at New York, county of New York, and State of New York, have invented certain new and useful Improvements in Cutters for Meat, Vegetables, and Pastry, of which the following is a specification.

This invention relates to an improved vegetable chopping implement adapted for use in chopping or cutting vegetables into relatively fine particles, the invention having for a general object to provide an implement of this type characterized by ease of manipulation, and efficiency and rapidity of operation.

A more specific object is to provide a multiple-edged vegetable chopping implement of light and inexpensive, but durable, construction.

For further comprehension of the invention, and of the objects and advantages thereof, reference will be had to the following description and accompanying drawings, and to the appended claims in which the various novel features of the invention are more particularly set forth.

Figure 1 of the drawings is a perspective view of a vegetable chopping implement constructed according to my invention.

Fig. 2 is a vertical sectional view thereof.

Fig. 3 is a detail perspective view of one of the cutting blades.

My improved implement is of multiple-blade construction comprising two series of blades arranged in grill like formation.

In constructing my improved implement I provide a thin metallic strap which is bent to form a rectangular frame, preferably square, as seen in edge view, the two pairs of opposed walls of this frame forming the outer blades of the two series above referred to, these pairs of walls being numbered 1, 1 and 2, 2 respectively.

Within this frame are fixed a desired number of intermediate knife blades of which there are here provided one pair 3, soldered or otherwise secured at opposite ends to the elements 1 and extending parallel to the elements 2, and a second pair 4, soldered or otherwise secured at opposite ends to the elements 2 and extending parallel to the elements 1, these intermediate knives being spaced evenly in the frame so that the combined cutting blades form a series of squares as seen in edge view.

These intermediate blades 3, 4 are preferably of equal width to the frame blades 1, 2 as clearly shown in Figs. 1 and 2, with their cutting edges in the same plane as the cutting edges of the latter, and to enable these intermediate knives to cross each other they are each formed with a pair of slots such as 6 extending from one edge half-way toward the other edge so that the two series of intermediate knives can be assembled and interlocked together in grill form.

In connection with my improved implement I provide a novel form of handle designed, by a simple and inexpensive arrangement of parts, both to facilitate the manipulation of an implement of this type, and to brace the frame structure thereof. This handle comprises a pair of crossed rods 7 and 8 whose main lengths extend horizontally above the cutting blades and diagonally of the latter and which have their ends turned downwardly as at 7' and 8' to engage in the corners of the outer frame element 1, 2, to which they are soldered, the two rods being also soldered together at the point where they cross as at 10.

It will be obvious that the construction of these rods 7 and 8 is such that a rigid brace is formed by a continuous bar of metal extending diagonally across the frame and secured to diagonally disposed corners. It is well known that rectangular frames of this character are liable to distortion by the approach of diagonally opposite corners so that the frame instead of being rectangular becomes diamond or lozenge shaped. The brace rods in this device, running as they do continuously from corner to corner, prevent such distortion. Moreover the downwardly bent ends of the rods engaging in the angles formed by adjacent sides and being there secured aid in preventing such distortion.

Having thus described my invention what I claim as new and desire to protect by Letters Patent of the United States is as follows:

1. In a device of the kind described, an outer strap-like cutting blade forming a rectangular frame, and handle means adapted to prevent distortion of said frame and consisting of rigid wires extending continously across said frame between diagonally disposed corners thereof and having their ends immovably attached to said corners.

2. In a device of the kind described, an outer strap-like cutting blade forming a rectangular frame, and handle means adapted to prevent distortion of said frame and consisting of rigid wires extending continuously across said frame between diagonally disposed corners thereof, said wires having their central portions parallel to the frame and being provided with rectangularly bent ends extending within the angles formed by adjacent sides of the frame, said ends being soldered to the frame sides whereby the ends strengthen the angles of the frame and assist in preventing distortion thereof.

In testimony whereof I have affixed my signature.

LUISE A. BUCHTEL.